United States Patent
Nip et al.

(10) Patent No.: US 11,884,548 B2
(45) Date of Patent: Jan. 30, 2024

(54) ZINC CARBONATE, STABLE NANO ZINC OXIDE, AND METHODS OF MAKING THE SAME

(71) Applicants: Raymond L. Nip, Bangkok (TH); Attaporn Bandit, Samut Prakan (TH)

(72) Inventors: Raymond L. Nip, Bangkok (TH); Attaporn Bandit, Samut Prakan (TH)

(73) Assignee: Global Chemical Co., Ltd., Samutprakarn (TH)

( * ) Notice: Subject to any disclaimer, the term of this patent is extended or adjusted under 35 U.S.C. 154(b) by 0 days.

(21) Appl. No.: 17/876,884

(22) Filed: Jul. 29, 2022

(65) Prior Publication Data

US 2023/0339763 A1    Oct. 26, 2023

Related U.S. Application Data

(60) Provisional application No. 63/332,925, filed on Apr. 20, 2022.

(51) Int. Cl.
| | |
|---|---|
| *C01G 9/02* | (2006.01) |
| *C01B 32/60* | (2017.01) |
| *C01G 9/00* | (2006.01) |

(52) U.S. Cl.
CPC .............. *C01B 32/60* (2017.08); *C01G 9/02* (2013.01); *C01G 9/00* (2013.01); *C01P 2004/64* (2013.01); *C01P 2006/60* (2013.01)

(58) Field of Classification Search
CPC ...................................................... C01G 9/02
See application file for complete search history.

(56) References Cited

U.S. PATENT DOCUMENTS

| | | | |
|---|---|---|---|
| 4,902,568 A | 2/1990 | Morohoshi | |
| 5,132,104 A * | 7/1992 | Yamamoto | ............... C01G 9/02 106/419 |
| 6,555,075 B2 | 4/2003 | Nip | |
| 7,635,729 B2 | 12/2009 | Nip | |
| 2003/0031617 A1 | 2/2003 | Nip | |
| 2003/0152508 A1 | 8/2003 | Nip | |
| 2003/0452508 | 8/2003 | Nip | |
| 2005/0240033 A1 | 10/2005 | Lee et al. | |
| 2007/0072959 A1 | 3/2007 | Nip | |
| 2021/0400983 A1 | 12/2021 | Nip et al. | |

OTHER PUBLICATIONS

International Search Report and Written Opinion, International Pat. Appl. No. PCT/US2023/065874, dated Sep. 7, 2023; 12 pgs.; ISA/US, Alexandria, VA.

* cited by examiner

*Primary Examiner* — Stuart L Hendrickson
(74) *Attorney, Agent, or Firm* — Andrew D. Fortney; Central California IP Group, P.C.

(57) ABSTRACT

A method of preparing a transparent zinc carbonate is disclosed. The method includes dissolving a zinc source in aqueous ammonium carbonate, removing metal impurities from the solution, injecting $CO_2$ into the zinc ammonia carbonate solution, heating a resulting slurry to a temperature of about 100° C. or more until the ammonia is substantially absent from the solution, and drying the resulting zinc carbonate at a temperature from around 150° C. to 300° C. for a length of time that removes water, but retains a significant part of the $CO_2$ content. The ammonia and the carbon dioxide are present in the aqueous solution in a ratio by moles or by weight effective to dissolve the zinc. A nano zinc oxide can be prepared by drying the zinc carbonate at a temperature of 300-400° C. for a length of time sufficient to remove substantially all of the $CO_2$.

20 Claims, No Drawings

ZINC CARBONATE, STABLE NANO ZINC OXIDE, AND METHODS OF MAKING THE SAME

CROSS REFERENCE TO RELATED APPLICATIONS

This application claims the benefit of U.S. Provisional Pat. Appl. No. 63/332,925, filed on Apr. 20, 2022, incorporated herein by reference as if fully set forth herein.

FIELD OF THE INVENTION

The present invention generally relates to processes for making zinc carbonate and zinc oxide. More specifically, embodiments of the present invention pertain to novel methods for making transparent zinc carbonate and stable nano zinc oxide.

DISCUSSION OF THE BACKGROUND

Zinc carbonate and zinc oxide are two widely-used materials in various rubber products, such as tires, shoes, automobile parts, conveyor belts, and latex. They are also used in animal nutrition, anti-UV and anti-microbial applications. Highly-transparent zinc carbonate is desirable for transparent rubber products, such as shoe soles, rubber bands, latex gloves, etc.

Products such as rubber bands, latex gloves and condoms, rubber hoses, etc., are routinely manufactured using zinc oxide. Since ancient times, zinc oxide has also been used in medicine, in various lotions and creams, and in human and animal nutrition. Its efficiency as animal feed is known to save money and reduce zinc pollution in the environment. The discovery of nano zinc oxide and its superiority to larger-particle zinc oxides (e.g., French press ZnO) in many applications is also known. It is now recognized that the physical size and shape of zinc oxide may be more important than its chemical properties.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention provides improved methods for making a transparent zinc carbonate with a greater $CO_2$ content and a nano zinc oxide with greater stability, larger surface area, and smaller particle size.

The present invention concerns methods for preparing transparent zinc carbonate and nano zinc oxide by injecting carbon dioxide gas into a zinc ammine solution or a solution of one or more zinc salts. The method of preparing transparent zinc carbonate may comprise dissolving a zinc source in an aqueous solution of ammonia and carbon dioxide (e.g., ammonium carbonate) in a ratio by moles or by weight effective to dissolve the zinc in the zinc source, removing one or more metal impurities (e.g., iron, copper, lead) from the solution (e.g., using hydrogen peroxide, zinc dust, or an equivalent thereof) if necessary or desired, optionally filtering any solids or precipitates from the solution, injecting $CO_2$ into the zinc ammonia carbonate solution (e.g., by bubbling $CO_2$ through the solution or introducing $CO_2$ into the atmosphere of the reaction chamber or reaction vessel) at a pressure of 0 to 50 psi and a temperature of approximately 5 to 50° C. (e.g., until less than 5% of zinc remains in the solution as soluble zinc), heating the resulting slurry to a temperature of about 90° C. or more (e.g., about 100° C.) until the ammonia is substantially absent from the solution to obtain zinc carbonate, optionally washing the zinc carbonate to remove water-soluble matter, optionally filtering the precipitated zinc carbonate, and drying the zinc carbonate at a low temperature (e.g., from around 100° C. to 250° C. or any range therein, such as 100-150° C.) for a length of time that removes water, but retains a significant part (e.g., most) of the $CO_2$ content of the zinc carbonate to obtain the transparent zinc carbonate.

The zinc carbonate resulting from heating the slurry until all or substantially all of the ammonia is removed has a $CO_2$ content of 15% to 20% (the theoretical $CO_2$ content as calculated from the chemical formula $ZnCO_3$ is 35.2%). The actual $CO_2$ content can be higher or lower, depending on the pressure and/or duration of carbonation. In the drying step, one balances drying time verses temperature, which may vary among different drying apparatuses (e.g. rotary dryers vs. furnaces or ovens). For example, after drying, the zinc carbonate may contain 20% or less by weight (e.g., <10% by weight) of water, but retains at least 25% (e.g., ≥40%) of the theoretical $CO_2$ content (i.e., the dried zinc carbonate contains at least 9%, and more preferably at least 14%, by weight of $CO_2$). When the zinc carbonate contains less than about 30% of $CO_2$, it is actually a mixture of zinc carbonate and zinc oxide.

The method of making nano zinc oxide comprises the above method of making transparent zinc carbonate, plus drying the transparent zinc carbonate at a higher temperature, such as 300° C. or more (e.g., 300-400° C.) for a length of time sufficient to remove at least some or substantially all of the $CO_2$ (e.g., about 1-4 hours or more). As the present transparent zinc carbonate has a higher carbon dioxide content than conventionally-made zinc carbonate, its decomposition may be relatively violent, and smaller particles may result. When newly made, the present nano zinc oxide may have a surface area of 60 to 120 m²/g (or any value or range of values therein, such as 95-120 m²/g), making it the highest grade of the three standard grades of nano zinc oxide.

In some embodiments, an even smaller transparent zinc carbonate and possibly more stable nano zinc oxide can be made by adding a porous additive during carbonation and/or heating to remove ammonia. For example, the method of making transparent zinc carbonate may comprise dissolving a zinc source in an aqueous solution of ammonia and carbon dioxide, removing one or more metal impurities from the aqueous solution, adding 2 to 8% of silica (silicon dioxide) into the aqueous solution with agitation, then boiling the aqueous solution until the zinc precipitates. At this point, the precipitated zinc may form a slurry. Alternatively, a slurry may be formed from the precipitated zinc. The method further comprises heating a slurry comprising the precipitated zinc to a temperature of about 90° C. or more until the ammonia is substantially absent to obtain zinc carbonate, and drying the zinc carbonate at a temperature of around 100° C. to 150° C. for a length of time sufficient to remove water, but retain a significant part of $CO_2$ in the zinc carbonate, to obtain the transparent zinc carbonate. The ammonia and the carbon dioxide are present in the aqueous solution in a ratio by moles or by weight effective to dissolve the zinc in the zinc source.

In other embodiments, zinc carbonate can be obtained by substantially the same method as the present method for preparing transparent zinc carbonate discussed above, but after purification, the slurry/solution is heated (e.g., to boiling) until ammonia is no longer detected and substantially all of the zinc in the solution is precipitated, then the resulting white precipitate is washed, filtered to separate the solid material, and dried at a relatively low temperature (e.g., 100-150° C.) for a length of time (e.g., 1-2 hours or thereabout) sufficient to remove most (e.g., >80-90%) of the water, but retain a significant part (e.g., >40% of theoretical) of the $CO_2$ content of the zinc carbonate. In other or further embodiments, the zinc ammine carbonate solution can be replaced by a zinc ammonium chloride or zinc ammonium sulfate solution (e.g., a zinc chloride or zinc sulfate salt as the zinc source can be dissolved in aqueous ammonia [e.g., ammonium hydroxide], rather than the aqueous solution of ammonia and carbon dioxide).

These and other advantages of the present invention will become readily apparent from the detailed description of various embodiments below.

DETAILED DESCRIPTION

Reference will now be made in detail to one or more embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures and components have not been described in detail so as not to unnecessarily obscure aspects of the present invention. Furthermore, it should be understood that the possible permutations and combinations described herein are not meant to limit the invention. Specifically, variations that are not inconsistent may be mixed and matched as desired.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

For the sake of convenience and simplicity, "part," "portion," and "region" may be used interchangeably herein, but are generally given their art-recognized meanings. Wherever one such term is used, it also encompasses the other terms. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

The term "nano zinc oxide" refers to a zinc oxide having an average primary particle size of 100 nm or less (e.g., 2-100 nm), or a particle size distribution in which ≥50% of the particles have a particle size of 100 nm or less. Alternatively, a nano zinc oxide may have a BET surface area of ≥20 $m^2/g$ or any other minimum value ≥20 $m^2/g$ (e.g., ≥30 $m^2/g$, ≥100 $m^2/g$, etc.).

By definition, any zinc oxide with a particle size under 100 nm is nano zinc oxide. However, 20 nm nano zinc oxide is different from 80 nm zinc oxide in certain applications. There is also a concern about different stability properties of differently-prepared nano zinc oxides. Lower-grade (e.g., lower purity) nano zinc oxides tend to grow bigger as the storage time increases. Nano zinc oxide made by the method of Example 4 below has a surface area of about 65 $m^2/g$ when newly made. However, this surface area decreases to about 30 $m^2/g$ after four months. The nano zinc oxide made by the present method has a surface area that decreases from about 80 $m^2/gr$ to about 60 $m^2/gr$ in four months.

The following examples appear to demonstrate that, at least to some extent, the physical size and shape of zinc carbonate and zinc oxide may be more important than their respective chemical properties.

EXAMPLES

Example 1: Preparation of Zinc Ammonia Carbonate Complex Solution

French process zinc oxide (1,400 grams) was added to an ammonium carbonate solution (10.5 kg) containing 10.74% ammonia and 6.18% carbon dioxide, and agitated until all of the zinc oxide is dissolved. Zinc dust (40 grams) was added with heavy agitation for 30 minutes, and then the resulting slurry was filtered. The filtrate (11.1 kg) is a zinc ammonia carbonate complex solution containing 9.78% zinc, 9.48% ammonia, and 5.45% carbon dioxide. This is called Solution A. Solution A contains less than 1 ppm of heavy metal as lead and less than 2 ppm of iron.

Example 2: Preparation of Alternate Zinc Ammonia Carbonate Complex Solution

An impure zinc source (e.g., zinc ash or a similar crude source of zinc oxide) was dissolved in a solution of a zinc ammine salt and purified of heavy metal and iron as needed according to U.S. Pat. No. 7,635,729. This is called Solution B. Solution B is a replacement for and/or an equivalent of Solution A for the present methods. For example, in Solution B, the zinc ammine salt can be zinc ammine chloride or zinc ammine sulphate.

Example 3: Preparation of Basic Zinc Carbonate

Solution A (1,000 grams) was heated to boiling until ammonia could no longer be detected and substantially all of the zinc was precipitated. The white precipitate was washed, filtered, and dried at 105° C. for 6 hours. Basic zinc carbonate (157.7 grams) was obtained. This is called zinc carbonate C.

Example 4: Preparation of Nano Zinc Oxide

Solution A (1,000 grams) was heated to boiling until ammonia could no longer be detected and substantially all of the zinc was precipitated. The white precipitate was washed, filtered, and dried at 250° C. for 4 hours. Nano zinc oxide (134 grams) was obtained. It is called nano zinc oxide D.

Example 5: The Present Method

Carbon dioxide (8.42 metric tons) was injected into zinc ammonium carbonate solution A (30 ton) in a 30 m$^3$ reactor. The pH of the solution dropped from 10.74 to 8.42, and the amount of soluble zinc in the solution dropped from 8.04% to 2.11%. A white powder (zinc carbonate) precipitated. The injection of carbon dioxide was stopped, and the slurry was heated to boiling until all of the zinc precipitated. The precipitate was washed, filtered and dried in a rotary dryer at a temperature of 220° C. to form zinc carbonate powder E. Alternatively, the zinc carbonate precipitate was heated at a temperature of about 250° C. to form nano zinc oxide F.

Zinc carbonate powder E has a surface area of 56.4 m$^2$/g, contains about 57% by weight of zinc, and has excellent transparency and other mechanical properties in rubber products.

Nano zinc oxide F has a surface area of 100 m$^2$/gr, and is very transparent in rubber products and suntan lotions.

Another big advantage of the present methods for making zinc carbonate and nano zinc oxide is that pollution (e.g., undesired byproducts) as measured by total dissolved solids is greatly reduced, as the present methods do not use soda ash and do not produce sodium sulfate. Sodium sulfate is not economic to recover or treat, especially in small quantities. The methods disclosed in U.S. Pat. No. 7,635,729 also produce zinc carbonate and thus nano scale zinc oxide, but the particles thereof are usually coarser and tend to grow larger with time. For example, nano zinc oxide made from the present method has a surface area per gram that is about 1.5 times larger (or more) than that made from the method of Example 4 above. It is also surprising that the larger surface area of the present nano zinc oxide decreases only up to 20% in area over a given length of time, compared with a drop of over 30% in the BET surface area (surface area per gram) of the nano zinc oxide made with the method of Example 4. In the world of nanotechnology, the particle size of the nanoparticles is inversely related to their area per unit weight, although this relationship is not necessarily linear. Also, it is generally accepted in nanotechnology that the smaller the nanoparticles, the more reactive and the less stable they are (and the faster they are expected to lose their advantageous properties, such as surface area per gram).

Example 6: Alternative Example of the Present Method

A solution (2,000 g) of fine zinc ash (320 g) from refined EAF dust, ammonia, and carbon dioxide was prepared. The solution contains 56% zinc, 11% ammonia, 6% carbon dioxide, and the balance water. The zinc ash can also be obtained from steel galvanizing, or refining of EAF dust using a rotary kiln. Iron-containing impurities can be removed with an oxidizing agent such as hydrogen peroxide, and heavy metals such as copper, nickel, lead, etc. can be removed by cementation with fine zinc dust. After purification, a zinc ammonia carbonate complex solution with about 9% of soluble zinc was obtained. This solution has a pH of about 10.55. Alternatively, the purification steps can be omitted when a relatively pure solution made with pure zinc oxide and other pure raw materials is prepared. Carbon dioxide (about 190 grams) was metered at a pressure of about 30 psi into the zinc ammonia carbonate complex solution. During the injection of carbon dioxide, the pH of the solution dropped from 10.55 to 9.26, and precipitation occurred until the zinc concentration remaining in the solution was about 1.32%. The resulting slurry/suspension was boiled until substantially all of the zinc precipitated from the solution, and no detectable zinc remained in the solution.

The zinc carbonate slurry was discharged, washed, and then filtered. The filter cake is a basic zinc carbonate with about 57% zinc. It is then dried and calcined into nano zinc oxide with just enough heat to decompose the zinc carbonate into slightly more than 90% zinc oxide. It is then milled and packed for sale. In some cases, the powder was heated again to make sure it contains no more than 0.5% water, as it tends to absorb water due to its high surface area per unit mass.

The new method for making nano zinc oxide can be summarized in the following procedure:
A) Prepare a zinc ammonia carbonate solution with about 9% zinc, about 11% ammonia, and about 6% carbon dioxide by weight.
B) Remove the iron in the solution by adding 10-15 ml of 35% hydrogen peroxide per kg of the zinc ammonia carbonate solution.
C) Remove heavy metals like copper, lead, etc., by adding a small amount of zinc dust under heavy agitation, then filtering (e.g., after 10-120 minutes of agitation).
D) Inject carbon dioxide gas into the reaction vessel at a pressure of up to 40 psi. Keep the temperature below 50° C. by cooling. White zinc carbonate begins to precipitate.
E) Continue to inject carbon dioxide until soluble zinc in the solution phase of the zinc carbonate slurry drops to 3% or below.
F) Heat the solution/slurry to the boiling point (at a temperature around or above 92° C.) with good agitation to precipitate basic zinc carbonate particles. After all of the zinc is precipitated from the solution, wash and filter the zinc carbonate particles, then dry them to obtain basic zinc carbonate, or directly dry and calcine the zinc carbonate particles to obtain nano zinc oxide.
G) After drying, calcine the basic zinc carbonate at 300° C. or above to convert the basic zinc carbonate into a relatively free-flowing zinc oxide. This zinc oxide may still contain $ZnCO_3$, and may have a $CO_2$ content of up to about 7.5% (by weight or mass).

The obtained nano zinc oxide generally has a surface area of around 20-80 m$^2$/g, which corresponds to a particle size of 40 to 120 nm, or any value or range of values therein.

Using the conventional zinc sulfate and soda ash process, a zinc carbonate with 17.47% $CO_2$ was obtained using the above procedure A)-F). This is less than the theoretical content of 35.2% $CO_2$ calculated for the formula $ZnCO_3$, but acceptable for many applications.

Example 7: Extremely Fine and Stable Nano Zinc Oxide

The method of Example 1 was followed, through completion of the purification of the zinc ammonia carbonate solution. However, instead of boiling the solution, $CO_2$ was injected into the solution under a pressure of 20 psi until a white precipitate appeared. The pH of the resulting slurry was around 9.3±0.5.

The resulting slurry was then heated to boiling after the zinc content in the clear solution decreased to less than 2%. After almost all of the zinc in the clear solution was precipitated (i.e., the clear solution contained less than 0.1% zinc), the slurry was washed, filtered and washed again until the wash water was free of ammonia and carbon dioxide.

The filter cake was dried and calcined at a temperature of 300-350° C. for a length of time sufficient to decompose the white precipitate into very fine and dispersible nano zinc oxide. The resulting nano zinc oxide had a surface area of about 80 $m^2$/gr to 90 $m^2$/gr.

For steel reinforcement of tires, adhesion of rubber to steel wires is very important. Replacing regular French process ZnO with nano ZnO in accordance with the present invention (e.g., nano ZnO P12 or NC359) can increase the adhesion of rubber to steel by up to 40%.

Example 8: Nano Zinc Oxide and Transparent Zinc Carbonate with Porous Particles In order to increase the surface area and/or reduce the particle size, a small amount of extremely porous particles was added to the zinc ammonium complex solution, before or during boiling or carbonation of the solution. For example, a mesoporous silica (trade name VN3, obtained from Evonik Corporation) having a pore size of about 3 to 4 nm was added. In this case, the resulting nano zinc oxide and transparent zinc carbonate formed from the zinc ammonia complex solution are extremely small. A surface area of about 100 $m^2$/gr is reliably obtained. Using a vacuum dryer, transparent zinc carbonate can be obtained at a relatively low temperature (e.g., 100-150° C.). The stability of the resulting nano zinc oxide (as determined by the decrease in surface area per unit mass over time) is surprisingly good. For example, the surface area per unit mass of nano zinc oxide made with 7% of mesoporous silica (VN3) decreased from 100 $m^2$/g to 65 $m^2$/g over 5 months' time, while the same nano zinc oxide made without the silica decreased from 70 $m^2$/g to 35 $m^2$/g in 5 months. Other nanoparticles, such as bentonite, can be used in this method with similar results. It is believed that the pore size of the nanoparticle (e.g., 1-10 nm or any range therein) is helpful for forming stable, high-surface-area nano zinc oxide.

Example 9: Rubber Bands Made According to the Method of U.S. Pat. No. 7,635,729 (to Show Transparency of Zinc Carbonate)

| Materials | Formulation (amounts in parts per 100 parts by weight of rubber) | |
|---|---|---|
| | A | G |
| 1. Natural Rubber STR 5 L | 100.0 | 100.0 |
| 2. Stearic Acid | 1.0 | 1.0 |
| 3. ZnCO₃ HA* | 1.5 | — |
| 4. ZnCO₃ P12** | — | 1.5 |
| 5. Accelerator MBTS | 1.0 | 1.0 |

-continued

| Materials | Formulation (amounts in parts per 100 parts by weight of rubber) | |
|---|---|---|
| | A | G |
| 6. Accelerator TMTD | 0.1 | 0.1 |
| 7. Wingstay-L | 1.0 | 1.0 |
| 8. Sulphur | 2.0 | 2.0 |
| Grand total | 106.60 | 106.60 |

*Prepared according to Example 3, but in which the zinc carbonate is converted to zinc oxide at a relatively high temperature.
**Prepared according to Example 6.

The above formulations were mixed and press cured at 160° C., Tc 90 (90% cure time, or until 90% cross-linking is achieved). The temperature for all testing was 25° C.

| Test Properties | Formulation A | Formulation G |
|---|---|---|
| ZnCO₃ source | ZnCO₃ HA | ZnCO₃ P12 |
| Amount | 1.5 | 1.5 |
| Hardness | 26.0 ± 0.00 | 27.00 ± 0.00 |
| 300% Mod. (Shore A) | 1.10 ± 0.00 | 1.20 ± 0.00 |
| 500% Mod. (MPa) | 2.20 ± 0.10 | 2.40 ± 0.00 |
| Tensile Strength (MPa) | 16.03 ± 0.25 | 20.17 ± 0.38 |
| Elongation at Break (%) | 825.9 ± 10.68 | 880.1 ± 6.63 |
| Tear Strength (kN/m) | 25.03 ± 1.01 | 26.27 ± 1.19 |
| Density (g/cm³) | 0.937 ± 0.002 | 0.936 ± 0.001 |
| Transparency (%) | 33.50 | 35.50 |

Example 10: Stability Comparison of Various Nano Zinc Oxides

Among various zinc oxides made by Global Chemical Co., Ltd. (Samut Prakarn, Thailand), some (e.g., HC grade) are prepared at a relatively high calcination temperature, while some (e.g., AZ12N) are prepared at a more conventional temperature (300-350° C.). Some of the zinc oxides have a very stable BET surface area, but some have a less stable surface area (i.e., it decreases by a relatively large rate over time).

In general, the present method(s) produce zinc oxide having an unexpectedly high and a surprisingly stable surface area-to-mass ratio. For example, nano zinc oxide made according to Example 4 (the closest known prior process) generally has a surface area-to-mass ratio in the range of 20-80 $m^2$/g when freshly made. However, the surface area-to-mass ratio tends to fall into the range of about 20-30 $m^2$/g after 6-12 months. On the other hand, nano zinc oxide made according to Example 6 generally has a surface area-to-mass ratio in the range of 60-90 $m^2$/g when freshly made. The surface area-to-mass ratio of this nano zinc oxide decreases to about 50 $m^2$/g after 6 months, but stays above 40 $m^2$/g after 12 months. The nano zinc oxide made according to Example 8 generally has a surface area-to-mass ratio of up to 120 $m^2$/g when freshly made. The surface area-to-mass ratio of this nano zinc oxide decreases to about 60 $m^2$/g after 6-12 months.

Results of experiments demonstrating the above surface area-to-mass ratio stability are in the following table.

| ZnO Sample | Trade name of ZnO in Thailand | Description of Preparation Method | Period 1 Newly made | Period 2 6 months after making | Period 3 1 Year after making |
|---|---|---|---|---|---|
| 1 | Zinc Oxide AZ12N (Control/ Comparison) | Example 4: Ordinary ammonia, $CO_2$ with boiling, Zinc complex solution A (about 6% $CO_2$, 11% $NH_3$, 9% Zn); Surface area when newly made and dried; Normal amount of $CO_2$ only | 20 $m^2/g$ to 80 $m^2/g$ | About 20 $m^2/g$ to 30 $m^2/g$ | 20 $m^2/g$ to 30 $m^2/g$ |
| 2 | Zinc Oxide P12 (Present Invention) | Example 6: Add $CO_2$ into solution A (Inject $CO_2$ into solution A so that its zinc content is below 2%, under pressure if necessary), then boiling the solution | 60 $m^2/g$ to 90 $m^2/g$ | About 50 $m^2/g$ | Above 40 $m^2/g$ |
| 3 | Zinc Oxide AZ359 (Present Invention) | Example 8: Add silica (7%) or other porous materials | Up to 120 $m^2/g$ | About 60 $m^2/g$ | About 60 $m^2/g$ |

It is easy for nano particles to agglomerate into larger-sized particles, so the decrease in surface area per unit mass of ZnO over time is expected to be inversely proportional to particle size (i.e., the rate at which the surface area per unit mass of ZnO having a relatively small particle size decreases with time is expected to be greater than that of ZnO having a relatively large particle size). However, the results from the above experiments show that ZnO prepared according to Examples 6 and 8 not only has a larger surface area per unit mass (i.e., smaller particle size) than the ZnO prepared according to Example 4, but that its surface area per unit mass decreases at a smaller rate than the ZnO prepared according to Example 4 (with the exception of certain special and/or rare low-end cases, such as ZnO having a surface area per unit mass at or near 20 $m^2/g$), and thus the surface area per unit mass of ZnO prepared according to Examples 6 and 8 is also relatively stable as compared to the ZnO prepared according to Example 4. This result is unexpected.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A method of preparing a nano zinc oxide, comprising:
   a) preparing an aqueous zinc ammonia carbonate solution from a zinc source, ammonia and carbon dioxide, wherein the ammonia and the carbon dioxide are present in a ratio by moles or by weight effective to dissolve the zinc in the zinc source;
   b) removing one or more metal impurities from the solution;
   c) injecting $CO_2$ into the zinc ammonia carbonate solution at a pressure up to about 40 psi and a temperature of approximately 5 to 50° C.;
   d) heating a resulting slurry to a temperature of about 90° C. or more until the ammonia is substantially absent from the solution to obtain zinc carbonate; and
   e) drying the zinc carbonate at a temperature from around 150° C. to 400° C. for a length of time that removes water and at least some of the $CO_2$ and provides the nano zinc oxide, wherein the nano zinc oxide has a surface area-to-mass ratio of 60-120 $m^2/g$ when freshly made and above 40 $m^2/g$ after 12 months.

2. The method of claim 1, wherein the $CO_2$ is injected into the zinc ammonia carbonate solution until less than 5% of zinc remains in the solution as soluble zinc.

3. The method of claim 1, wherein the zinc source comprises a zinc ammine solution or a solution of one or more zinc salts, and forming the aqueous zinc ammonia carbonate solution comprises injecting carbon dioxide gas into the zinc ammine solution or the solution of one or more zinc salts.

4. The method of claim 1, wherein the one or more metal impurities comprise iron, copper, or lead.

5. The method of claim 4, wherein removing the one or more metal impurities from the solution comprises adding hydrogen peroxide or zinc dust to the solution to form a solid or precipitate comprising the one or more metal impurities.

6. The method of claim 5, further comprising filtering the solid or precipitate from the solution.

7. A method of making zinc carbonate, comprising:
   a) preparing an aqueous zinc ammonia carbonate solution from a zinc source, ammonia and carbon dioxide, wherein the ammonia and the carbon dioxide are present in a ratio by moles or by weight effective to dissolve the zinc in the zinc source;
   b) removing one or more metal impurities from the aqueous solution;
   c) adding 2 to 8% of silica into the aqueous zinc ammonia carbonate solution with agitation, then boiling the aqueous solution until the zinc precipitates;
   d) heating a slurry comprising the precipitated zinc to a temperature of about 90° C. or more until the ammonia is substantially absent to obtain the zinc carbonate; and
   e) drying the zinc carbonate at a temperature of around 100° C. to 150° C. for a length of time sufficient to remove water, but retain a significant part of the $CO_2$ in the zinc carbonate.

8. The method of claim 7, comprising adding the silica into the aqueous zinc ammonia carbonate solution.

9. The method of claim 7, wherein the silica has a pore size of 1-10 nm.

10. The method of claim 7, wherein heating the resulting slurry precipitates the zinc carbonate, and the method further comprises filtering the precipitated zinc carbonate.

11. The method of claim 7, further comprising washing the zinc carbonate to remove water-soluble matter.

12. The method of claim 7, wherein the slurry is heated until all or substantially all of the ammonia is removed and the zinc carbonate has a $CO_2$ content of 15% to 30%.

13. A method of preparing a nano zinc oxide, comprising:
a) the method of claim 7; and
b) further drying the zinc carbonate at a temperature of 300° C. or more for a length of time sufficient to remove at least some of the $CO_2$ and form the nano zinc oxide.

14. The method of claim 13, wherein the nano zinc oxide has a surface area of 60 to 120 $m^2/g$.

15. The method of claim 7, wherein the zinc carbonate is dried for about 1-4 hours.

16. The method of claim 13, wherein the slurry is heated to boiling until ammonia is no longer detected and substantially all of the zinc in the solution is precipitated to form a white precipitate.

17. The method of claim 16, further comprising washing and filtering the white precipitate.

18. The method of claim 13, wherein the zinc source comprises a zinc chloride or zinc sulfate salt.

19. The method of claim 7, wherein 80-90% of the water is removed, the length of time is about 1-2 hours, and >40% of a theoretical amount of the $CO_2$ content of the zinc carbonate is retained.

20. The method of claim 7, wherein, after drying, the zinc carbonate contains 20% or less by weight of water, but retains at least 25% of a theoretical $CO_2$ content of the zinc carbonate.

* * * * *